United States Patent
Regunath

(10) Patent No.: US 8,030,875 B2
(45) Date of Patent: Oct. 4, 2011

(54) ACTUATOR ARRANGEMENT AND A METHOD OF OPERATING AN ACTUATOR

(75) Inventor: Shane Regunath, Sheffield (GB)

(73) Assignee: Rolls-Royce PLC, London (GB)

( * ) Notice: Subject to any disclaimer, the term of this patent is extended or adjusted under 35 U.S.C. 154(b) by 521 days.

(21) Appl. No.: 12/087,514

(22) PCT Filed: Dec. 21, 2006

(86) PCT No.: PCT/GB2006/004838
§ 371 (c)(1),
(2), (4) Date: Jul. 9, 2008

(87) PCT Pub. No.: WO2007/085784
PCT Pub. Date: Aug. 2, 2007

(65) Prior Publication Data
US 2009/0064655 A1 Mar. 12, 2009

(30) Foreign Application Priority Data
Jan. 28, 2006 (GB) .................................. 0601775.0

(51) Int. Cl.
*G05B 11/01* (2006.01)
(52) U.S. Cl. ................... 318/671; 318/552; 251/129.04; 251/129.11; 417/129; 477/30; 477/48; 477/89; 477/146; 477/155
(58) Field of Classification Search .................. 318/127, 318/135, 432, 560, 652, 671, 689, 114, 115, 318/552, 434; 251/129.04, 129.11, 120; 73/112.01, 116.03; 173/166; 417/129; 123/399; 361/632; 477/30, 48, 49, 89, 146, 155, 206
See application file for complete search history.

(56) References Cited

U.S. PATENT DOCUMENTS

| | | | | |
|---|---|---|---|---|
| 4,375,797 A | * | 3/1983 | Otsuka et al. | 123/679 |
| 4,450,680 A | * | 5/1984 | Otsuka et al. | 60/274 |
| 4,641,517 A | * | 2/1987 | Spock et al. | 73/112.01 |
| 4,841,209 A | | 6/1989 | Poumakis | |
| 5,123,246 A | | 6/1992 | Younessi et al. | |
| 5,422,808 A | * | 6/1995 | Catanese et al. | 700/79 |
| 6,158,208 A | * | 12/2000 | Hommema | 60/39.281 |
| 6,530,351 B2 | * | 3/2003 | Mikame | 123/90.15 |
| 7,017,550 B2 | * | 3/2006 | Hata et al. | 123/399 |
| 7,096,657 B2 | * | 8/2006 | Mahoney et al. | 60/39.25 |
| 7,246,495 B2 | * | 7/2007 | Muramatsu et al. | 60/773 |
| 7,332,884 B2 | * | 2/2008 | Rozman et al. | 318/432 |

FOREIGN PATENT DOCUMENTS

| | | |
|---|---|---|
| EP | 0 190 467 A2 | 8/1986 |
| EP | 0 978 772 A2 | 2/2000 |
| JP | A-63-259139 | 10/1988 |

* cited by examiner

*Primary Examiner* — Walter Benson
*Assistant Examiner* — Antony M Paul
(74) *Attorney, Agent, or Firm* — Oliff & Berridge, PLC

(57) ABSTRACT

Interruption in supervisory position control signals can cause problems with respect to actuators which upon loss of such control signals for the actuator will generally slew to a fixed idle position. In such circumstances a machine such as a gas turbine engine in which an actuator is associated will not sustain performance even though there is continued local power supply to the actuator. By utilizing a local controller which stores actuator response profiles for certain machine status stages through perturbation or marginal activation of the actuator an appropriate actuator response profile can be chosen and therefore sustaining control signals presented to the actuator to maintain machine operation.

16 Claims, 4 Drawing Sheets

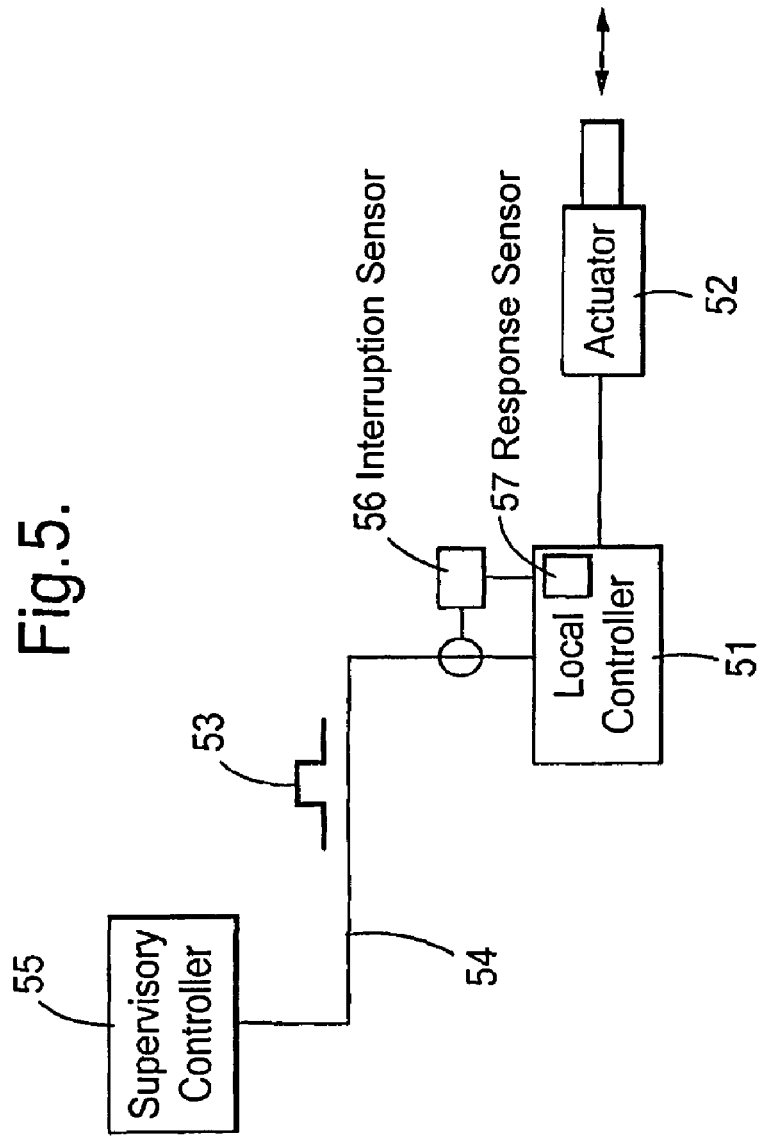

ACTUATOR ARRANGEMENT AND A METHOD OF OPERATING AN ACTUATOR

The present invention relates to actuators and more particularly to actuators utilised within gas turbine engines.

Actuators are used in a wide number of implementations within machinery in order to adjust and vary valve settings and other devices.

There are numerous actuation systems in a gas turbine engine. These actuation systems are used to improve the performance of the gas turbine engine over its entire operational envelope whilst maintaining safe operation. Listed below are some of the actuation mechanisms that exist on a typical gas turbine application 1. Variable stator vane actuator
2. Turbine case cooling valve
3. Fuel metering valve
4. Bleed valves
5. Anti icing valves Many of these current actuation mechanisms rely on hydraulic or pneumatic pressures for the actuation drive. The current industrial trend is to replace many of these technologically older solutions (i.e. pneumatic/hydraulic driven actuators) with electrically driven actuation systems. As the reliability and performance of electrical motors have improved to allow operation in harsh environments and as the technology evolves and makes these devices more compact, more electrical actuation systems will make their way onto aero gas turbine applications and other machines.

These actuators generally through a displacement will shift in position and alter the valve setting as required. Within an engine it will be understood that typically a fail safe position or means of handling must be achieved. Typically, the actuator will utilise a translational electrical actuation displacement using a DC motor receiving appropriate control signals from a central or supervisory controller. This supervisory controller will adjust the various actuators within a machine such as a gas turbine engine to provide the desired operational performance with appropriate efficiency. Unfortunately with prior electrical actuators loss of command communication but not power from the central supervisory controller will result in the actuator slewing to its lowest speed setting at a pre defined slew rate. In an example fuel supply valve this approach will result in a reduction in the fuel flow into the engine or machine at a predetermined rate until the engine is at an idle speed. Clearly such an approach is not ideal particularly if interruption in communication is only temporary.

FIG. 1 is a graphic illustration of actuator position 1 against desired demand position 2 determined by a supervisory controller. The deviations between actual actuator position 1 and demand position 2 are as a result of communication failures illustrated by line 3 over the demonstrated time period.

In accordance with certain aspects of the present invention there is provided an actuator arrangement comprising an actuator and a controller, the actuator dependent in terms of actuator position upon a position control signal, the controller having an actuator response profile against actuator position for each determinable status of a machine, the controller having a response sensor to marginally activate the actuator into terms of displacement of position to determine an actuator response value shift on the actuator response profile indicative of machine status.

Generally, the machine is a gas turbine engine.

Possibly, the controller comprises a sustained control signal to sustain actuator position.

Possibly, the controller has an interruption sensor to determine interruption of the position control signals.

Possibly, the controller activates the response sensor when the interruption sensor determines interruption of the control signal.

Possibly, the actuator has a power supply independent of the control signal.

Further in accordance with certain aspects of the present invention there is provided a method of actuator control where actuator position is dependent on a position control signal, the method comprising:— a) defining an actuator response profile against actuator position for a determinable status of a machine incorporating the actuator; and
b) marginally activating the actuator in terms of displacement position to determine the actuator response value on the actuator response profile indicative of machine status.

Typically, the method provides a sustained control signal to sustain actuator position dependent upon machine status.

Possibly, the method includes determining interruption in the position control signal.

Typically, performing the marginal actuation of the actuator only occurs when there is interruption of the position control signal.

Generally, determination of the actuation response value is by matching with the actuator response profile for the marginal actuation of the actuator.

Typically, the marginal actuation of the actuator involves determining the torque resistance to the marginal shift in position of the actuator.

Typically, the actuator is displaced by an electrical motor. Normally, that electric motor is a direct current electric motor.

Embodiments of certain aspects of the present invention will now be described by way of example only and with reference to the accompanying drawings in which:—

At the heart of most electrical actuation systems, there is a DC motor as DC motors have better handling characteristics at low speeds. As such they are generally used when varying actuation speeds are required but an AC motor could be used. It is a characteristic of a DC motor that the speed of the motor is proportional to its voltage and the torque extorted by the motor is proportional to electrical current.

By utilising this relationship between voltage and torque, at any instance in time the local controller on actuation will have two pieces of information:

1. The extension position of the actuator spindle/arm.
2. The torque it has to overcome.

By using this information a local controller for the actuator will be able to provide an appropriate control signal during a failure situation. This will offer the advantage that the actuator can continue functioning and more importantly a machine can continue to operate or a gas turbine engine can also be used for producing thrust.

This local control of the actuator is based on a determined actuator response profile for a pre-determined parameter such as torque so that for every operating point of the actuators extension/retraction path there is a specific torque force it will have to overcome for a given engine condition. Using this information a 3-D relationship between machine/engine condition vs. actuator position vs. actuator torque can be constructed. An example of this relationship is provided below in FIG. 2.

Figure 1:
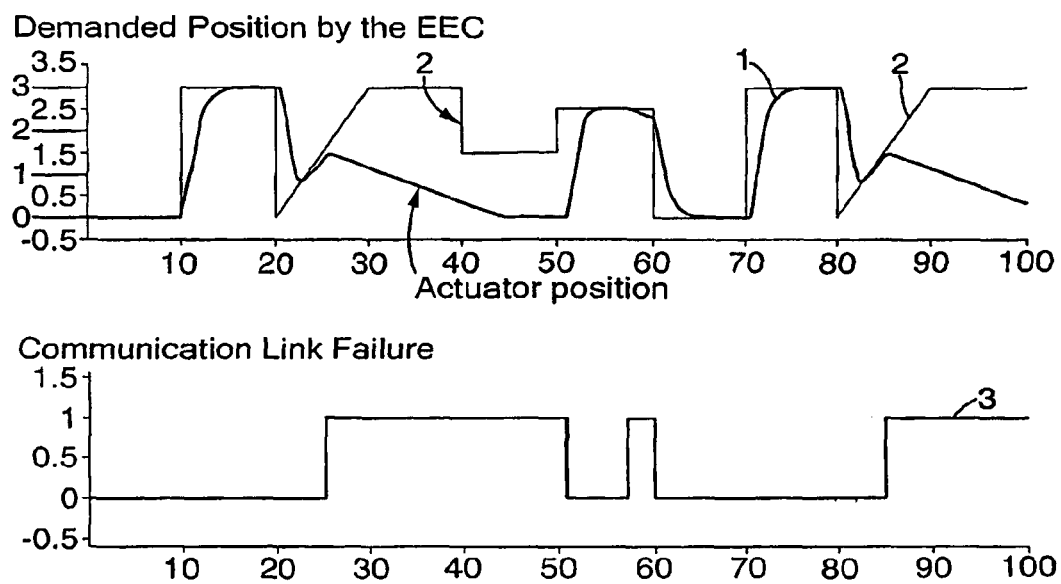
FIG. 1 is a graphic illstration of actuator position against desired demand position determined by a supervisory controller.
Figure 2:
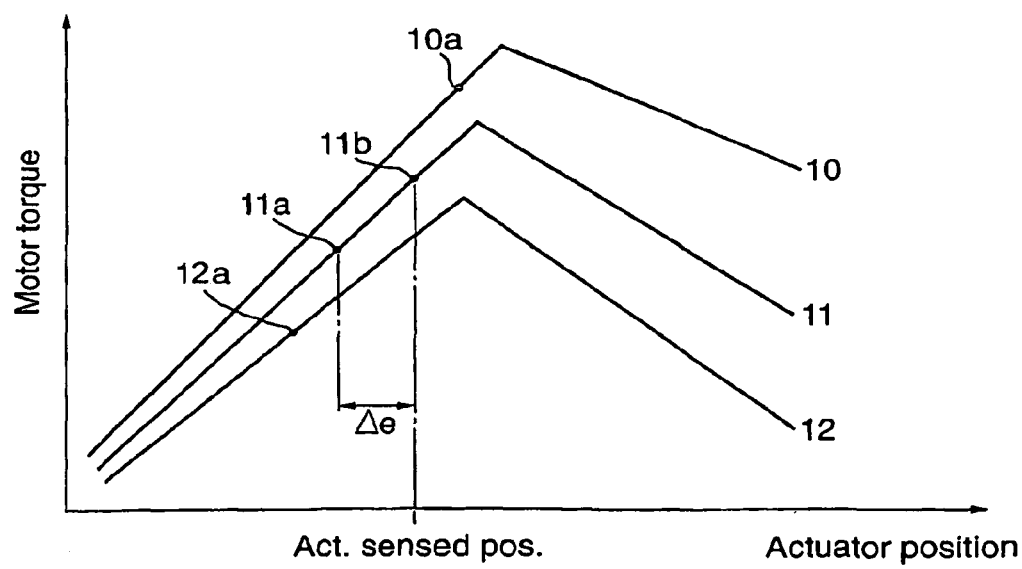
FIG. 2 is a graphic illustration of actuator displacement torque against actuator position for a number of machine status conditions.

As can be seen in FIG. 2 actuator response profiles 10, 11, 12 relate to three different machine or engine conditions with the positions 10a, 11a, 12a being illustrative of the torque required to sustain actuator position at a particular actuator position. As indicated above generally actuators are adjusted in terms of their setting through electric motors and therefore in terms of generating actuator response profiles it is convenient to use torque, but in other situations alternative measurements may be used. The value of the torque, or other measurement, as can be seen varies dependent upon actuator position and machine or engine status. Aspects of the present invention utilise this predictability with regard to response in order to allow local control of the actuator when there is an interruption in central control signals. In such circumstances the present method and arrangement provides for sustaining control signals based upon actuator position immediately prior to interruption in the central control signals from a supervisory controller. Thus, as indicated above continued performance of the actuator may be provided rather than slewing to an idle condition until communications from the supervisory controller can be restored.

It will also be appreciated that this local control is based upon actuator position just prior to interruption in normal communications with the supervisory controller. In such circumstances the present method and arrangement provides for sustaining control signals but if there should be adjustment signals from the supervisory controller these will not be incorporated. Therefore it may be necessary to provide an indication as to loss of communication to the actuator or possibly a time out feature with respect to local control of the actuator.

The present method and arrangement can be readily applied to existing control regimes for actuators. In particular installation will depend upon the operating equipment used.

It will be understood that with a current local control mechanism the principal change is that during a supervisory controller communication interruption the fail-safe position for the controller will now provide for the sustaining control signals in accordance with the actuator response profile as described above, rather than provide a universal fall-back value. This sustaining control signal is more appropriate to conditions just prior to communication failure.

Figure 3:
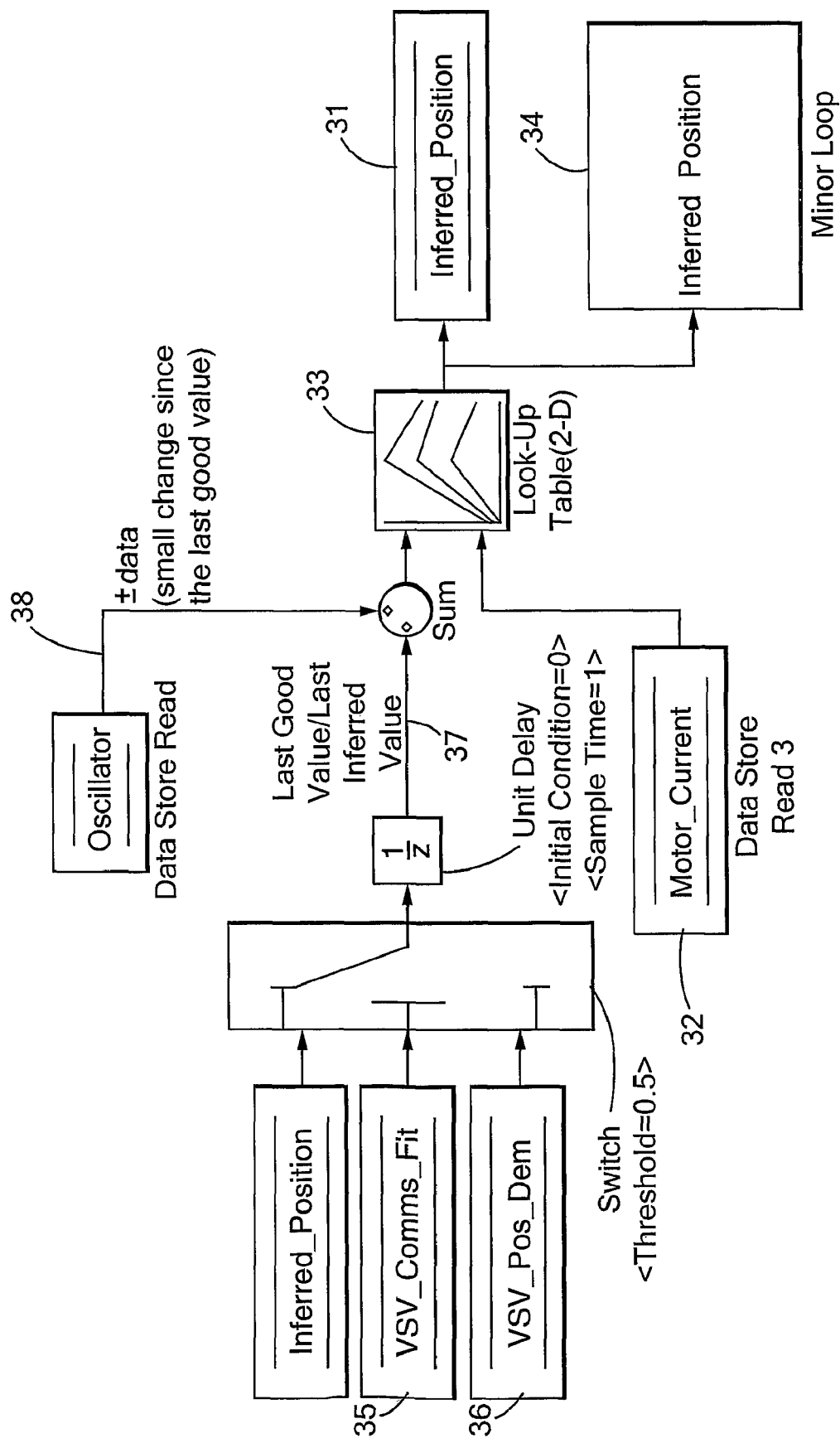
FIG. 3 is a schematic illustration of a controller in accordance with the arrangement and method of the present invention.

FIG. 3 describes a logic regime in order to generate an inferred position 31 for an actuator in accordance with aspects of the present invention. This logic will normally just pass 35 the demand position 36 from the supervisory controller. However, if the communication bus fails for whatever reason then the last good value 37 from the supervisory controller issued and through a positional perturbation or marginal activation 38 for actuator it is possible to provide a sustaining control signal. This perturbation or marginal activation along with the motor current 32 feedback is then used in a look up table 33 to generate the actuators inferred position demand.

A minor loop 34 may be provided to adjust the inferred position due to the marginal actuation and tolerance stock-up.

Figure 4:
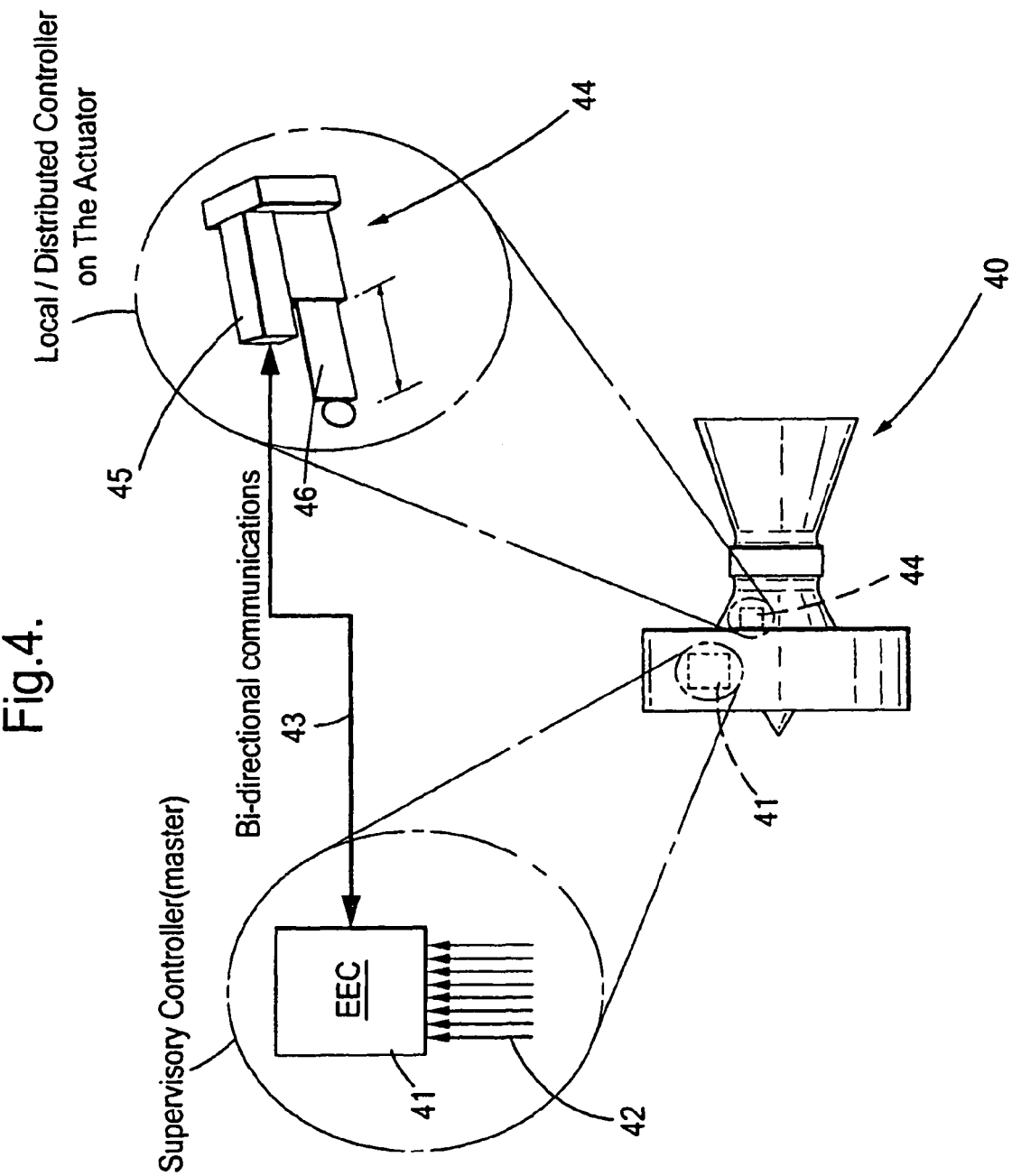
FIG. 4 is a schematic illustration of a gas turbine as an example machine incorporating an actuator with local controller and a supervisory controller; and, FIG. 5 is a schematic block diagram illustrating operation of an actuator arrangement.

FIG. 4 provides a schematic illustration of a typical electrical actuator system utilised with regard to a gas turbine engine 40. Thus, the engine 40 has a supervisory controller 41 which receives a number of measurement parameters 42 in order to determine the necessary actuator operational positions etc., for efficient operation of the engine 40 or to achieve operational demands as required. In such circumstances the supervisory controller 41 through a bi-directional communications network 43 communicates with an actuator 44 which incorporates its own local controller. This actuator in normal operation responds through position control signals to supervisory controller actuator control performance demands through the bi-directional communications network 43. However, should this communications network 43 fail so that positional control signals or other control signals are not received by the actuator 41 and in particular its local controller then, as described above, the actuator will typically be arranged to slew to an idle condition so that engine 40 operational performance is curtailed. Typically, as can be seen with regard to actuator 44 the local controller 45 will act to cause displacement and shift position of an actuator rod 46 in accordance with desired demands from the supervisory controller 41 or when communications are lost as described above and below to maintain a certain position through sustaining control signals from the local controller 45 in accordance with comparisons to an actuator response profile.

FIG. 5 provides a basic block diagram illustrating operation of an actuator arrangement in accordance with the present invention. Thus, a local controller 51 acts to provide control to an actuator typically through provision of electrical power to a DC motor as described above. The local controller 51 receives central control signals 53 through a control pathway 54 from a supervisory controller 55. In such circumstances in normal operation the supervisory controller 55 will provide signals 53 to the controller 51 to adjust the activator dependent upon varying performance criteria for a machine such as a gas turbine engine within which the actuator 52 is associated.

Aspects of the present invention are directed to a situation where the control path 54 is interrupted so that the supervisory control signals 53 are no longer provided to the local controller 51. In such circumstances interruption in the path 54 is determined by an interruption sensor 56 in order to initiate operational control by the local controller 51 in accordance with the method described above in terms of providing a sustaining electrical signal to the actuator dependent upon the immediately previous control position signals 53 for the supervisory controller 55.

As indicated previously the local controller will effectively include a look up table for varying actuator response profiles dependent upon different operational status for a machine within which the actuator 52 is associated. These response profiles as indicated above will generally relate to the torque necessary to sustain actuator position. In such circumstances by marginal actuation either up or down the necessary variational shift in the torque value can be determined and therefore a machine status inferred. From this inferred engine or machine status as indicated above it will be possible to sustain actuator position for that status. However, more open control and variation in actuator position will not be possible as the supervisory controller through which those demands are passed will not be able to communicate with a local controller 51. Nevertheless the present arrangement provides an improvement on previous fail-safe mechanisms with respect to local control of actuators in that rather than the machine arrangement being incapacitated continued operation is possible.

In view of the above it will be appreciated that generally a number of engine status conditions will be determined in terms of actuator response profiles to allow determination of the appropriate machine or engine status and therefore maintenance of actuator position. As illustrated above typically the perturbation or marginal actuation of the actuator will cause a value shift along one of the profiles. This can be accommodated either by a correction as described with regard to the logic and method regime described above or return of the actuator to its original position upon interruption in communication with the appropriate sustaining control signal in either event.

As indicated the actuator response profile in the example above is in relation to torque for sustaining actuator positioning. In such circumstances the controller has a response sensor 57 to determine the torque necessary to provide the marginal or perturbation in actuator position in order to determine through profile matching between the value shift and one of the actuator response profiles the appropriate machine status in terms of the best fit to an actuator response profile. Thus, the necessary actuator position can be sustained by a control signal from the local controller.

In normal operation the local controller as indicated above will incorporate a sensor to determine interruption in the supervisory controller signal to the local, normally slave controller for control of the actuator. In such circumstances the present method and arrangement will only be operational when there is an interruption in the supervisory controller signals sent to the local controller. The actuator and controller will in such circumstances have their own power supply independent of the central control signals providing position control signals to the actuator in normal operation.

As indicated above the example relates to torque to sustain actuator position but it will be understood in a distribution control architecture it may be possible to provide local controllers in relation to sensed engine operational conditions and parameters such as temperature, pressures, forces which are currently centrally monitored and controlled by a supervisory controller etc. By providing a level controller which can provide an actuator response profile in relation to the temperatures, pressures etc., it will be understood that this local controller could then sustain operation of the machine dependent upon that parameter when control signals in respect of these parameters with regard to engine status are not received from or by a supervisory controller.

Those skilled in the art will appreciate that modifications and alterations to the above can be readily performed. Thus, as illustrated the present method and actuator arrangement can be utilised in relation to gas turbine engines but could also be utilised with regard to actuators in other machines including automobile engines and other aspects of automobiles etc.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An actuator arrangement for a machine including a supervisory controller, the arrangement comprising:
   an actuator;
   an interruption sensor; and
   a local controller,
   the actuator dependent in terms of actuator position upon a position control signal provided from the supervisory controller,
   the local controller having an actuator response profile against the actuator position for each determinable status of the machine,
   the local controller being operable to marginally activate the actuator into terms of displacement of the actuator position when the interruption sensor determines interruption of the position control signal provided from the supervisory controller, and
   the local controller having a response sensor to determine an actuator response value shift on the actuator response profile indicative of the machine status.

2. An arrangement as claimed in claim 1 wherein the machine is a gas turbine engine.

3. An arrangement as claimed in claim 1 wherein the local controller includes a sustained control signal to sustain the actuator position.

4. An arrangement as claimed in claim 1 wherein the local controller includes the interruption sensor.

5. An arrangement as claimed in claim 4 wherein the actuator has a power supply independent of the position control signal.

6. An arrangement as claimed in claim 1 wherein the local controller activates the response sensor when the interruption sensor determines the interruption of the position control signal.

7. A gas turbine engine incorporating an actuator arrangement as claimed in claim 1.

8. A method of controlling an arrangement including an actuator and a local controller, the actuator dependent in terms of actuator position upon a position control signal provided from a supervisory controller, the method comprising:
   a) defining an actuator response profile against the actuator position for a determinable status of a machine the actuator; and
   b) marginally activating the actuator in terms of displacement position to determine an actuator response value shift on the actuator response profile indicative of the machine status, wherein the marginally activating the actuator only occurs when there is an interruption of the position control signal provided from the supervisory controller.

9. A method of actuator control as claimed in claim 8, the method further comprising providing a sustained control signal to sustain the actuator position dependent upon the machine status.

10. A method of actuator control as claimed in claim 8, the method further comprising determining the interruption in the position control signal.

11. A method of actuator control as claimed in claim 8 wherein determination of the actuation response value shift is by matching with the actuator response profile for the marginal actuation of the actuator.

12. A method of an actuator control as claimed in claim 8 wherein the marginally activating the actuator involves determining a torque resistance to the marginal shift in position of the actuator.

13. A method of actuator control as claimed in claim 8 wherein the actuator is displaced by an electrical motor.

14. A method of actuator control as claimed in claim 13 wherein the electric motor is a direct current electric motor.

15. A gas turbine engine incorporating an actuator controlled by a method as claimed in claim 8.

16. An actuator operated by a method as claimed in claim 8.

* * * * *